United States Patent
Fox et al.

(10) Patent No.: US 7,421,886 B1
(45) Date of Patent: Sep. 9, 2008

(54) QUICK CONNECT COUPLING TEST APPARATUS AND METHOD

(76) Inventors: Michael A. Fox, 39256 Camp St., Harrison Township, MI (US) 48045; James L. Terry, 25666 Carl, Roseville, MI (US) 48066

( * ) Notice: Subject to any disclaimer, the term of this patent is extended or adjusted under 35 U.S.C. 154(b) by 0 days.

(21) Appl. No.: 11/818,842

(22) Filed: Jun. 15, 2007

(51) Int. Cl.
*G01M 3/20* (2006.01)

(52) U.S. Cl. .............................. 73/40.7; 73/41; 403/31

(58) Field of Classification Search ............... 73/756, 73/40.7, 40, 41; 403/31
See application file for complete search history.

(56) References Cited

U.S. PATENT DOCUMENTS

| | | | |
|---|---|---|---|
| 3,584,637 A * | 6/1971 | Blaiklock | ............. 137/82 |
| 4,010,840 A | 3/1977 | Eberle | |
| 4,492,301 A | 1/1985 | Inaba et al. | |
| 4,602,499 A | 7/1986 | Norton et al. | |
| 4,875,275 A | 10/1989 | Hutchinson et al. | |
| 4,890,241 A | 12/1989 | Hoffman et al. | |
| 4,897,551 A | 1/1990 | Gersh et al. | |
| 4,954,005 A | 9/1990 | Knasel et al. | |
| 5,010,761 A | 4/1991 | Cohen et al. | |
| 5,018,266 A | 5/1991 | Hutchinson et al. | |
| 5,086,901 A | 2/1992 | Petronis et al. | |
| 5,131,706 A | 7/1992 | Appleberry | |
| 5,372,567 A | 12/1994 | Whittington et al. | |
| 5,484,219 A | 1/1996 | Drew et al. | |
| 5,614,661 A | 3/1997 | Balordi | |
| 5,618,990 A | 4/1997 | Iwao et al. | |
| 5,697,480 A | 12/1997 | Herbermann et al. | |
| 5,769,487 A | 6/1998 | Michler | |
| 5,782,571 A * | 7/1998 | Hufford et al. | ............. 403/31 |
| 6,073,512 A | 6/2000 | McCormick et al. | |
| 6,116,966 A | 9/2000 | Little et al. | |
| 6,199,928 B1 | 3/2001 | Bilsing | |
| 6,330,822 B1 | 12/2001 | Hawk et al. | |
| 6,332,350 B1 | 12/2001 | Inoue et al. | |
| 6,491,612 B1 | 12/2002 | Kurup et al. | |
| 6,513,802 B2 | 2/2003 | Seger | |
| 6,523,394 B2 | 2/2003 | Burke et al. | |
| 6,540,188 B2 | 4/2003 | Jenkins et al. | |
| 6,578,407 B1 | 6/2003 | McTaggart | |
| 6,588,965 B1 * | 7/2003 | Keech et al. | ............. 403/31 |
| 6,666,071 B1 | 12/2003 | McCormick | |
| 6,702,272 B2 | 3/2004 | Monvavage | |
| 6,842,666 B2 | 1/2005 | Katsuta | |
| 6,870,481 B2 | 3/2005 | Johnson | |
| 6,988,696 B2 | 1/2006 | Attee | |

* cited by examiner

*Primary Examiner*—Andre J Allen
(74) *Attorney, Agent, or Firm*—VanOphem & VanOphem, P.C.

(57) ABSTRACT

The invention is a quick connect coupling apparatus in the form of a test module for use in a robotic work performing application which accomplishes testing of an end effector in an offline location such that the integrity of each pneumatic circuit can be independently verified and any pneumatic components found leaking may be replaced at the offline location rather than result in downtime during production use.

14 Claims, 5 Drawing Sheets

QUICK CONNECT COUPLING TEST APPARATUS AND METHOD

CROSS-REFERENCE TO RELATED APPLICATIONS

Not applicable.

FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

This invention is related to a quick connect coupling apparatus and, more particularly to a quick connect coupling test apparatus for quickly connecting and/or disconnecting a tool or the like to or from a robot arm and to test the functioning of the tools attached to the robotic arm.

2. Description of the Prior Art

With the use of industrial robots flexible automated tooling systems have become an indispensable part of modern manufacturing. Whether assembling automotive vehicles, kitchen appliances, or computers, flexible automated tooling systems incorporating robots perform many manufacturing tasks tirelessly in hostile environments, and with high precision and repeatability. In particular, robots have found great utility in machining and welding operations for building automobile bodies, engines, chassis and drive train components. Flexible automated tooling is particularly helpful in sheet metal stamping operations where large automotive body panels must be moved through sequential stamping operations accurately and rapidly.

In many manufacturing applications, flexible automated tooling utilizing robots are programmed to accomplish a variety of tasks. For example, in automotive manufacturing operations, a robot may be utilized to manipulate parts through various machining operations such as grinding, cutting, shaping, or welding of metals. Specifically, in automotive vehicle body building operations, robots, using quick disconnect couplers with attached tooling, are used to move larger workpieces from station to station in stamping operations and to convey welding tools to various locations or into different orientations so that different tasks may be accomplished. In applications where different tooling needs to be used for the different parts being manufactured on the same production line, a quick disconnect coupler tool changer is used to mate different tools to the robot arm. One half of the tool changer, called the master or base module, is permanently affixed to a robot arm. The other half, referred to as a tool module or end effector, is fixed to each tool that the robot is programmed to utilize. The variety of tool modules that are required for a robot to perform these various tasks are generally stored on a tool rack or stand which is located off-line near the robot so that the robot can be programmed to make the appropriate tool changes and adapt the correct tool for the specific manufacturing task, as required.

In instances where a robot is programmed to repeatedly perform a single task, it is possible to manually change the tool mounted on the robot during down time of the production line as the robot is being reprogrammed to perform a new task. However, in the performance of a sequence of tasks, the manual change of tools is not efficient and the robot must therefore be enabled to automatically switch tools between sequential manufacturing runs. Even in instances where the robot is programmed to repeatedly perform a single task, the various parts traveling down the production line may change and accordingly, the robot is required to obtain a new end effector in order to enable the robot to perform its tasks on this new part.

Various tool mounts or connectors have been developed for mounting the master module to the tool module. The locking of the tool module to the master module is accomplished through various means. For example, some tool mounts use ball members, others spring members. Still, others utilize radial actuation rods or arc shaped locking members. In order for the robot to change tools and perform another function, the robotic arm places a coupled tool module member and its attached tool in a tool support rack containing a plurality of tool modules, having attached tooling to perform different functions, and disengages the locking mechanism which locks the tool module to the master module. The robotic arm then backs the master module away from the first tool module and then moves into registry with another tool module member with its associated tool member attached, located on the same tool support rack. Once the robotic master module is correctly aligned with the new tool module, the robotic arm moves the master module into engagement with the new tool module member and locks the tool module securely to the master module. The robot then removes the assembled master and tool modules from the tool support rack and into proper orientation to perform work by the attached tool on the workpiece.

Both master modules and tool modules include a plurality of pneumatic tubes and passages to secure the various connections between the source of power and the electrical and pneumatic components that utilize the power source. With all of these connections having to be verified secure, in order for the system to operate correctly, maintenance is always required to the various electrical and pneumatic components to maintain the secure connections. A slight variation in alignment can seriously damage the pneumatic feed nozzles or seals that form the pneumatic connection between the master or base module and the tool module. In some applications, to ensure a good seal between the pneumatic components, deep sockets on one member that receive protruding pneumatic nozzles on the opposite member are required so as to properly seal the pneumatic passages between the robotic arm and the tool module. Further, electrical connections must also be verified secure in order to provide power to the various tools attached to the tool module. Therefore, the robotic arm must move the base module in a very precise linear motion in order to effect the connection and disconnection when changing the tool module or end effectors. Any twisting or rolling of the tool module member would result in damage to the internal electrical components or pneumatic feed nozzles or seals, resulting in malfunctioning of the tool attached to the tool module. The accuracy demands require careful programming of the motion of the robot. Further, any hysteresis in the equipment motion, slight movement of the rack used to support the tool carrier member, or slight variance can result in improper alignment of the tool mount and damage the electrical components or pneumatic connections between the master module and tool module, again, resulting in partial or complete failure of the functioning of the end effector and its associated tooling.

With the electrical and pneumatic connections having to be verified secure, in order for the flexible automated tooling to function properly, maintenance is always required to insure the security of the connections in view of the hostile environment, as well as the precise alignments required in order to connect the master and tool modules. Naturally, any form of maintenance that will reduce the production rate is unacceptable. Accordingly, what is required is an off-line test procedure to verify the integrity of the electrical and/or pneumatic connections and feed passages of the various end effectors and associated tooling without interfering with the production capacity of the flexible automation system.

SUMMARY OF THE INVENTION

The invention is a quick connect test coupling apparatus which is intended to be used off-line to test the integrity of the seals, as well as to test the functionality of the attached tool, connection tubes, lines, pneumatic nozzles, sockets or electrical connections on quick connect coupling tool modules for robotic applications.

The invention is a test module which has been manufactured to replicate the physical characteristics of the master module in the actual manufacturing operation. The test module consists of a base member or locating plate which incorporates on one end face at the center thereof, a locking mechanism in order to lock the base member to the tool module. The preferred embodiment shows a locking arrangement with the use of three ball members locking into an undercut groove in the tool module, but could just as easily be spring members or arc shaped locking members. Since the locking features of the master module to the tool module could be accomplished through various means, it is intended that the test module also utilizes complimentary features to those of the tool module. Accordingly, the test module of the present invention has at the center thereof, a hand operated threaded shaft having at one end thereof a circular disk with a tapered peripheral surface which is attached to the shaft that is driven downwards by a hand knob attached to the threaded shaft. As the threaded shaft is turned clockwise, the balls move rapidly outward, in a ball cage, transverse to the axis of the threaded shaft to lock three ball members into an undercut groove of the tool module. At the periphery of the locating plate are a plurality of pneumatic feed inlets which are arranged to compliment the pneumatic passages bored through the tool module. The pneumatic feed inlets are surrounded by circular seals and through internal passages interconnect the pneumatic feed inlets with a source of power which is used to actuate the end effector or tools attached to the tool module. Each passage includes individual shutoff valves for isolating each pneumatic circuit. The number of circuits used will be a function of the application. Accordingly, the various applications may demand as many as ten (10) or more separate circuits while some applications may only utilize half such circuits in order to accomplish the desired function of the tool attached to the tool module. In addition, some of the passage connections can provide power for electrical connections to operate the tool attached to the tool module.

The hand knob at the upper face of the locating plate or base member is turned clockwise and through the threaded shaft located in the base member lowers the tapered disk, at the opposite end thereof, against the ball members so as to force the ball members in a radially outwardly direction and lock into the undercut grooves of the tool module. This action locks the two members together and simultaneously brings the circular seal surrounding each of the pneumatic inlets in line with the respective seats on the tool module to seal thereagainst so as create a sealed passage from the base member to the tool itself attached to the tool module. To test each of the pneumatic circuits the locating plate is attached to a source of air which can create a vacuum and is controlled by the use of a shutoff valve located on the top surface of the locating plate or base member. Each of the individual pneumatic circuits has its own independent shutoff valve mounted on the surface of the base member. As set forth above, each of the pneumatic circuits used can be individually isolated through the use of the individual shutoff valve located on the top surface of the locating plate. To assist in the proper orientation of the test module with the tool module, two tapered locator pins are found on either side of the locking arrangement so as to ensure proper alignment between the test module and the tool module when the test module is attached to the tool module and thereby ensure proper alignment and sealing of the circular seals of each of the pneumatic inlets with the circular seats circumscribing the passages through the tool module.

Once the test module is attached to the tool module, each individual circuit can be tested individually by placing all of the shutoff valves to a closed position. Since the circuits are numbered, their number is associated with the specific end effector on the tool and accordingly, in order to test the sealing status of the nozzles, tubing, as well as pneumatic cups each circuit is opened one at a time and a gauge can be used in each circuit to determine the value of the vacuum that is drawn as each of the individual shutoff valves are opened so that the sealing status of each of the pneumatic circuits can be individually determined. If the circuit has lost some sealing capacity, it is readily evident from the absolute value of the vacuum that is read for each circuit and therefore the seals in the circuit or connections thereof can be easily checked and corrected to maintain the appropriate vacuum on each of the vacuum cups of the tool. It is understood that although the preferred embodiment selected utilizes an attached tool that is referred to as a pick and place end effector, the invention proposes to test the functionality of the flexible automated tooling regardless of the type of tool attached as an end effector. For example, if a grinder is used the test module can be used to test the functionality of the grinder. Should fingers be used, as the tool, the test module can test the proper functioning of the fingers or determine whether any excessive wear has occurred and requires a tool change due to excessive wear. In other words, the use of a pick and place application using vacuum cups is not to be considered a limitation on the type of end effector tool with which the test module could be used to verify the proper functionality of the flexible automated tooling associated with robotic end effectors.

As a result of the ability to isolate each of the circuits of the quick connect coupling, the integrity of each pneumatic circuit as well as the functionality of the attached tool is easy to check while the tool module with the appropriate tools attached thereto is located on the tool support rack located adjacent and within reach of the robot.

It is an object of the present invention to provide a tool module for a quick connect coupling which will at all times be free from leaks and be able to determine the functionality of the end effector tool when the tool module is attached to the master module of the robot to accomplish its work function efficiently during the manufacturing of workpieces.

It is still another object of the present invention to provide a simple and quick verification of all of the functional features of a tool module for a quick connect/disconnect coupling and ensures that such features will be accomplishable efficiently and effectively without any leaks in any of the pneumatic components or malfunctions of the attached end effector tool.

It is still another object of the present invention to provide a robot end effector that reduces the maintenance cost of a quick connect coupling and is more reliable thus reducing down time of a manufacturing line.

It is yet a further object of the present invention that the electrical and pneumatic connections of the tool module of a quick disconnect coupling as well as the function of the end effector tool itself can be properly tested without interfering with the flexible automation tooling of the robotic application along a production line.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
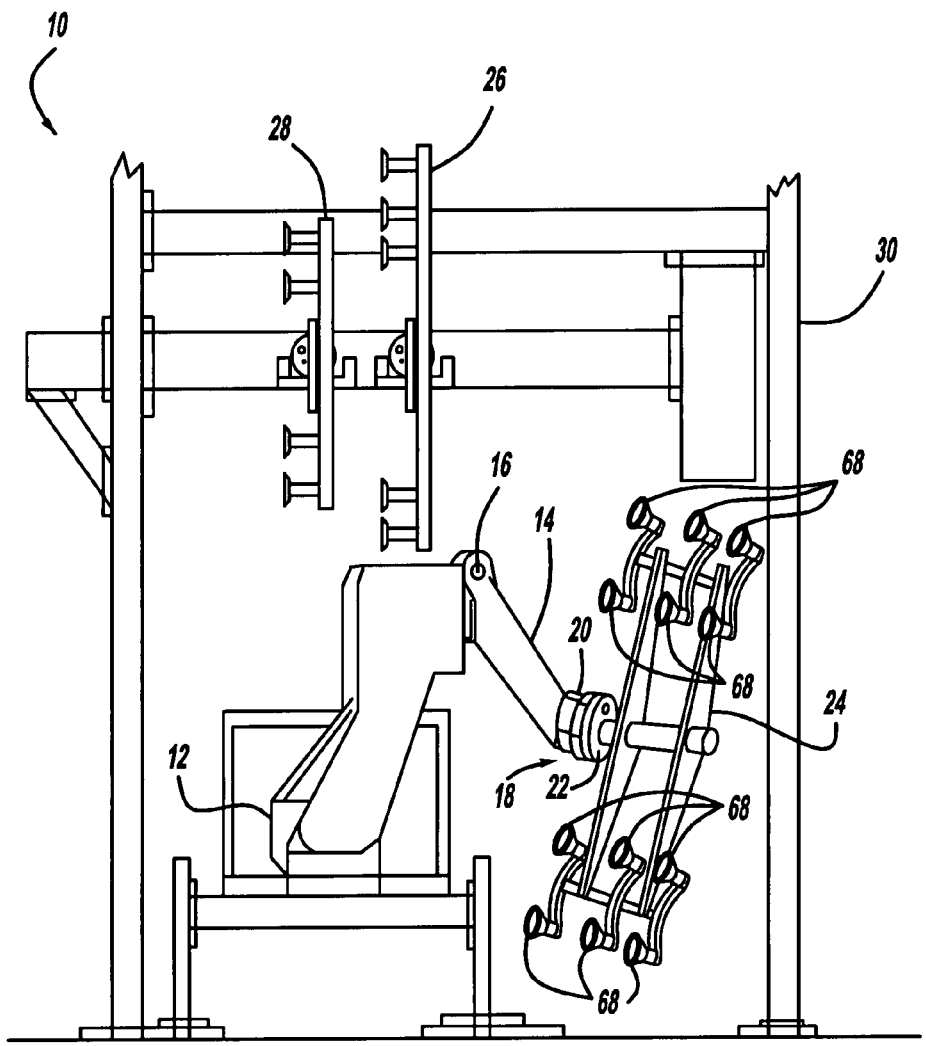
FIG. 1 is a side view of a programmable robotic Flexible Automation Station illustrating the tool support rack and wherein the robot has attached one of the three different pick and place tools for performing work on various parts.
Figure 2:
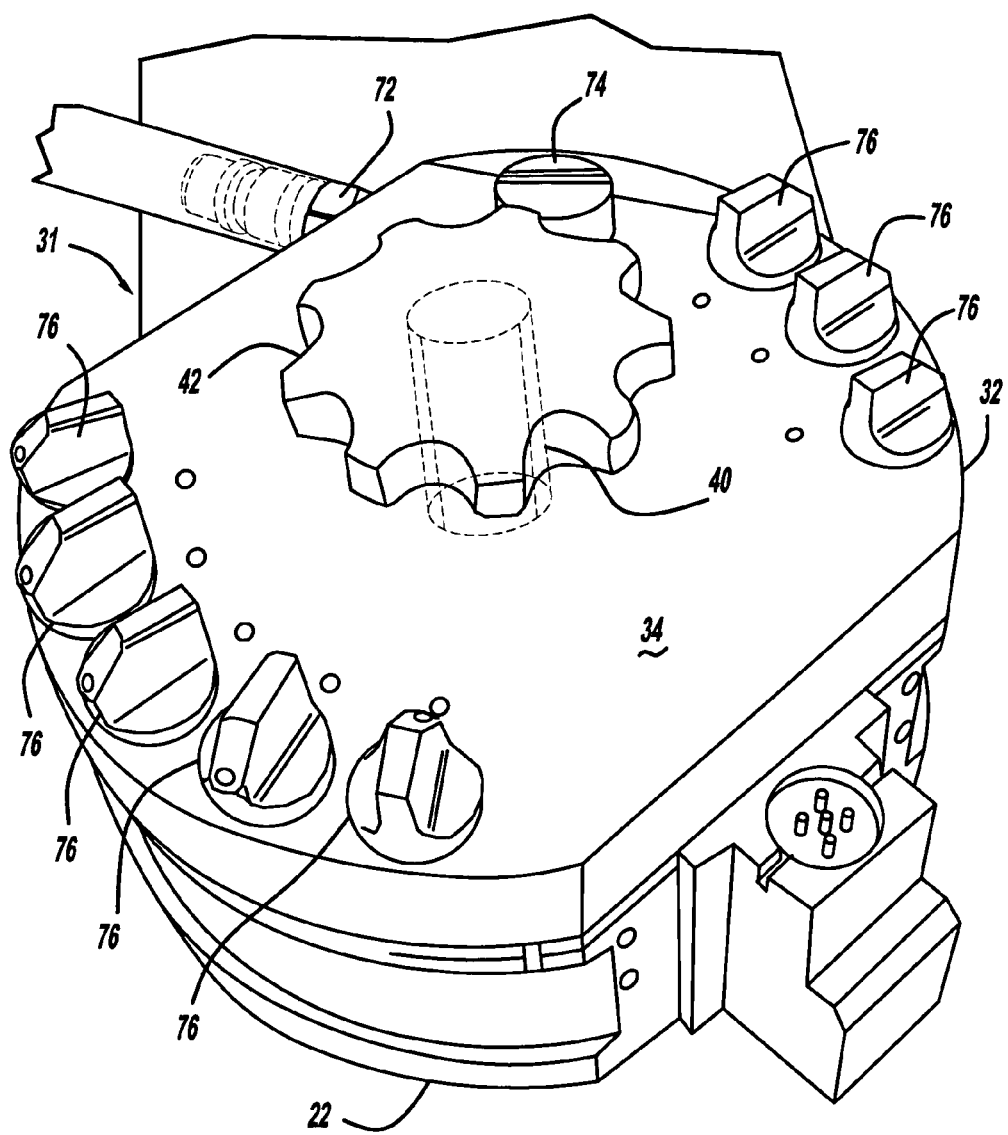
FIG. 2 is a fragmentary perspective view of a robot arm having a tool module of a quick connect/disconnect tool changer with the test module connected to the tool module to verify the integrity of each component, i.e. seals, connecting tubes, electrical connections, etc. of each tool function.

FIG. 1 illustrates a typical flexible automation work station 10 as may be used in a wide variety of manufacturing applications. The specific configuration of connectors, actuators, linkages, and the like are made very broadly depending upon the application and the particular design of the robot. Generally, the robot consists of a base 12 and an arm 14 that is supported by the base 12 through a series of connecting linkages 16. Secured to the terminal end of the arm 14 is a quick connect/disconnect tool changer or coupler 18. The quick connect/disconnect tool changer 18 includes a pair of mating modules, a master or base module 20, and a tool module 22. The master module 20 is adapted to be secured to the terminal end of the arm 14 while the tool module 22 is adapted to be coupled to the master module 20 when in use, and typically includes a tool or end effector 24, such as in this preferred embodiment of a pick and place mechanism shown in FIG. 1. It is understood that although the preferred embodiment selected utilizes an attached tool 24 that is referred to as a pick and place end effector, the invention proposes to test the functionality of the flexible automated tooling regardless of the type of tool 24 attached as an end effector 24. For example, if a grinder is used the test module can be used to test the functionality of the grinder. Should fingers be used, as the tool 24, the test module can test the proper functioning of the fingers or determine whether any excessive wear has occurred and requires a tool change due to excessive wear. In other words, the use of a pick and place application using vacuum cups is not to be considered a limitation on the type of end effector or tool 24 with which the test module could be used to verify the proper functionality of the flexible automated tooling associated with robotic end effectors 24. The robot may accommodate a variety of tools 24 with each tool 24 having its own individual tool module 22 secured thereto and wherein each of the individual tool modules 22 are adapted to connect to the master module 20 supported on the terminal end of the arm 14.

Quick connect/disconnect tool changers or couplers 18 increase the versatility of flexible automation. Any manufacturing operation wherein a change of tooling is contemplated can take advantage of quick connect/disconnect tool changers or couplers 18 to increase the efficiency of the operation. In the preferred embodiment such versatility permits the robots to be utilized to perform a variety of manufacturing operations. Quick connect/disconnect tool changers 18, in addition to mechanically coupling various tools 24 to arms 14, additionally supply utilities from the robot to the tool 24 attached as an end effector 24 to the arm 14. The utilities may include electrical power, pressurized air, hydraulic fluid, control and communication signals, and the like. According to the present invention, as illustrated in FIG. 1, the robot is adapted to provide a source of pressure so as to enable the creation of a vacuum (not shown) available at the flexible automation work station 10 and convey that source of pressure through the quick connect/disconnect tool changer 18 to the pick and place mechanism to enable the tool 24 to pick up a workpiece and carry that workpiece to a work performing station (not shown) located near the robot. If the end effector 24 requires power the source of power can also be conveyed through the quick connect/disconnect tool changer 18 and to the end effector or tool 24. After the work has been performed, in the preferred embodiment, the tool 24 picks up the workpiece and the robot loads it on a conveyor to carry it to the next workstation. In other applications, the quick connect/disconnect tool changer 18 may include electrical contacts designed, arranged, and selectively mated so as to effectively transfer an electrical current from the master module 20 to the tool module 22 and the tool 24. Since the invention is limited to a test module for verifying the functionality of the end effector tooling and in the preferred embodiment the integrity of the seals of the various fluid ports and connections for transferring fluid to the tool, i.e. vacuum cups, the remaining disclosure will be specific to the application of attaching a pneumatic tool which only utilizes a source of pressure. Such disclosure is not intended to be limiting since it has been herein above that a person skilled in the art can apply the features of the invention to any end effector to test the functionality thereof.

In such application, the robot will be directed to a specific location to, by the use of a vacuum, pick up a workpiece, and transfer the workpiece to a workstation where work will be performed on the workpiece. The robot is thereafter again programmed to lift the workpiece on which work has been performed and carry the workpiece to the next operation or perhaps to a conveying line which will carry the workpiece to a subsequent operation for additional work to be performed on the workpiece.

As indicated above, different parts may be conveyed and handled on the same line. Therefore, to accommodate the various changes in parts, a staging or tool support rack 30 is mounted within the vicinity of the robot such that when different parts are conveyed, the robot can be programmed to deposit on the tool support rack 30, the current tool 24 attached to the tool module 22 and master module 20, uncouple this current tool module 22 and associated tool 24 and then move the master module 20 attached to the arm 14 to another tool 26 or 28 located on the tool support rack 30 in order to attach and pick up the tool module 22 with a different tool 26 or 28 attached so that the newly attached tool module 22 and associated tool 26 or 28 can be used to perform work on a different part that is programmed to be conveyed along the production line to perform work thereon.

As can be understood by a person skilled in the art, the environment in which this robotic application operates is quite hostile. The importance of the newly attached tool module 22 and associated tool 26 or 28 functioning properly when it is programmed to be attached to the arm 14 is vital. Any malfunction whatsoever as a result of prior damage to the seals, the vacuum cups or associated lines can result in improper placement of the new part to be conveyed for work to be performed on the part. Further, misalignment of parts could result in the production of scrap. Accordingly, it is of utmost importance that the seals, associated electrical or fluid lines, and vacuum suction cups 68 on each of the pick and place mechanisms at all times function properly in order to produce parts within acceptable tolerance variations.

As shown in FIGS. 2-6, the invention is a test module 31 for a quick connect coupling which is intended to function the same as the master module 20 while the tools 24, 26, 28 are mounted on the tool support rack 30 so as to enable testing of the various vacuum suction cups 68 on each tool 24, 26, 28 during such time when the tool 24, 26, 28 is not in use. With the various pneumatic sealed connections between the arm 14, master module 20, tool module 22, as well as each tool 24, 26, 28, in a hazardous environment, any of these connections are subject to damage as a result of malfunction of any piece of equipment associated with the flexible automation work station 10, work performing devices or conveyor equipment. Such damage could create a loss of vacuum to any one of the vacuum suction cups 68 associated with the tool 24, 26, 28. Accordingly, the test module 31 has been manufactured to connect with a tool module 22 not in use by the robot and functions to test for any leaks in the pneumatic circuits in the tool module 22 and associated seals, connecting tubes or vacuum cups.

The test module 31 consists of a base member or locating plate 32 having a top end face 34 and bottom end face 36 which, at the center of the locating plate 32, is a locking mechanism 38 to lock the test module 31 to the tool module 22. The nature of the locking mechanism 38 that is used is not necessarily pertinent since the locking of the tool module 22 to the master module 20 as pointed out in the prior art, can be accomplished through the use of ball members, spring members, radial actuation rods, or arc shaped locking members. Accordingly, any one of these means could be used in the invention providing it securely locks the test module 31 to the tool module 22.

Figure 3:
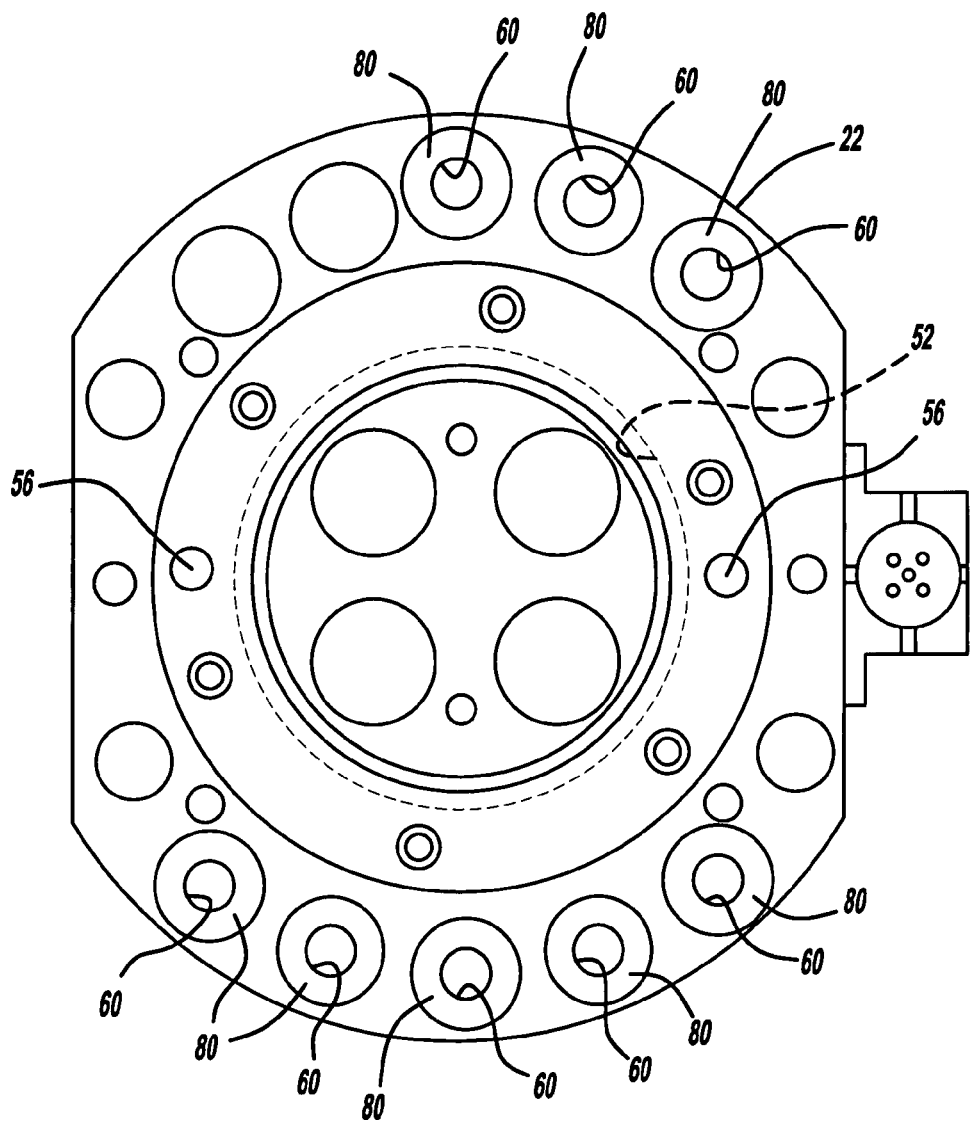
FIG. 3 is a plan view of one face of a typical tool module against which a test module is intended to be mounted.
Figure 4:
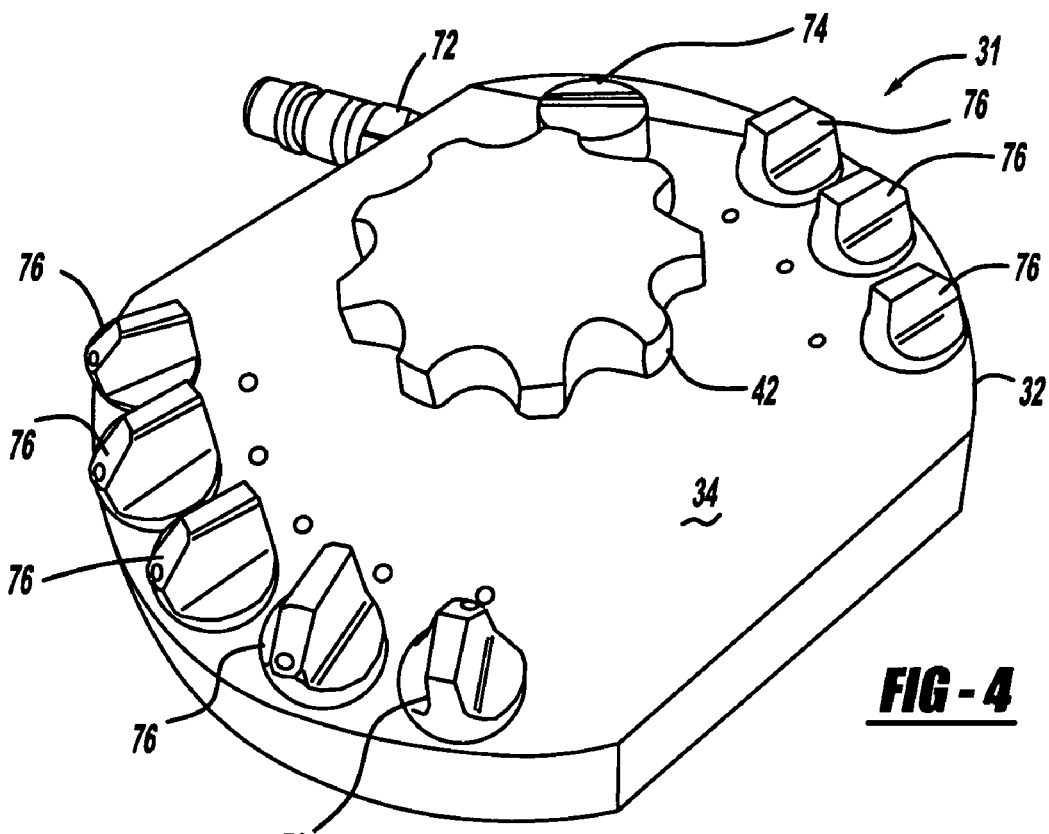
FIG. 4 is a perspective view illustrating the top face of the test module of the invention.
Figure 5:
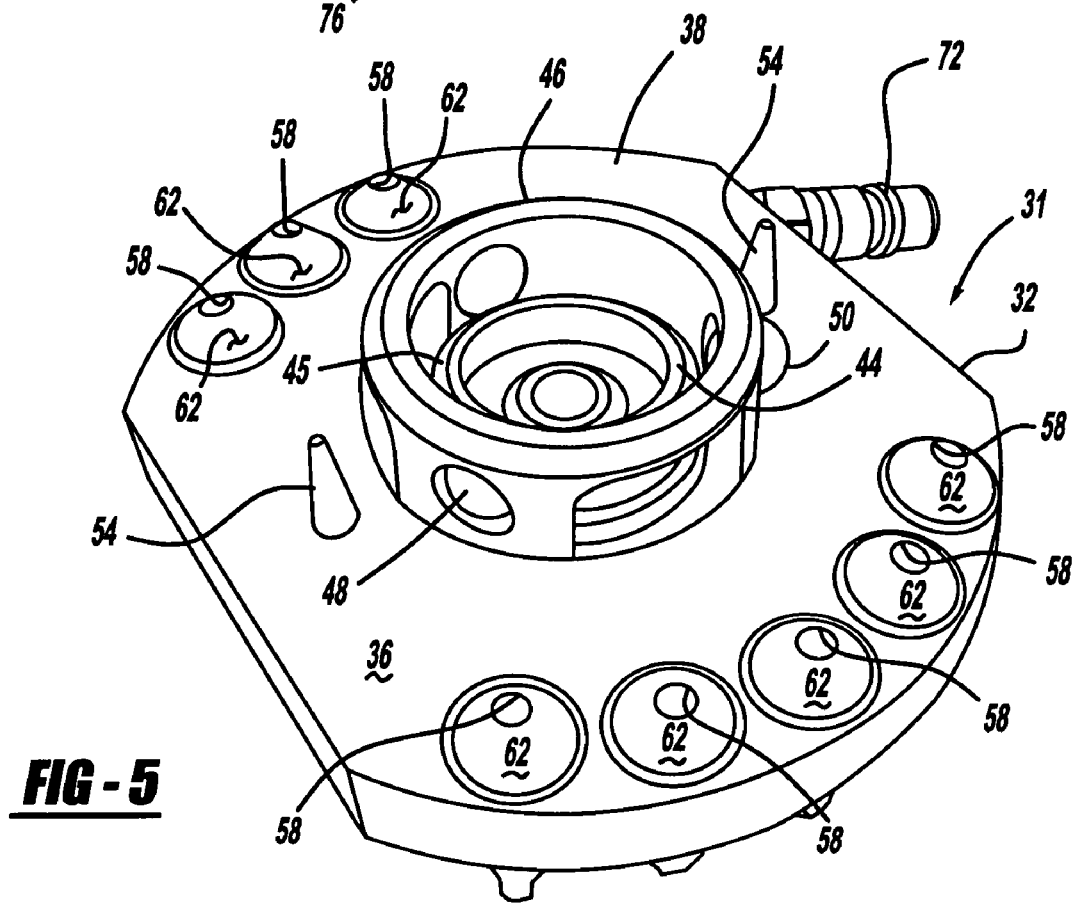
FIG. 5 is a perspective view illustrating the opposing or bottom face of the test module of the invention.

In the preferred embodiment, a ball and groove locking mechanism 38 is shown which provides for a threaded screw 40 mounted through the locating plate 32 of the test module 31 having attached thereto, at one end thereof, a hand knob 42 with the opposite end being attached to a cylindrical disk 44 having a 45 degree circumferentially chamfered edge 45 along its peripheral edge. The cylindrical disk 44 extends from the bottom end face 36 of the locating plate 32 and is surrounded by a ball cage 46 mounted to the bottom end face 36 of the locating plate 32. The ball cage 46 has three ball windows 48 in which are located three roller balls circumferentially located at 120 degrees from each other. The three roller balls communicate with the 45 degree circumferentially chamfered edge 45 of the cylindrical disk 44 so that when the hand knob 42 is turned clockwise, the three roller balls travel radially outward to lock into an undercut groove 52 in the tool module 22 as shown in FIG. 3. Turning the hand knob 42 counter clockwise allows the three roller balls to move radially inwards within the three ball windows 48 to unlock the test module 31 from the tool module 22. To assist in proper alignment of the test module 31 with the tool module 22, upon assembly, two tapered locator pins 54 extend from the bottom end face 36. These two tapered locator pins 54 are aligned with two alignment holes 56 in the tool module 22 to insure proper alignment when the test module 31 and tool module 22 are assembled. Proper alignment is important to avoid damage to the seals surrounding the pneumatic feed inlets 58 in the locating plate 32 as is discussed hereinafter.

Figure 6:
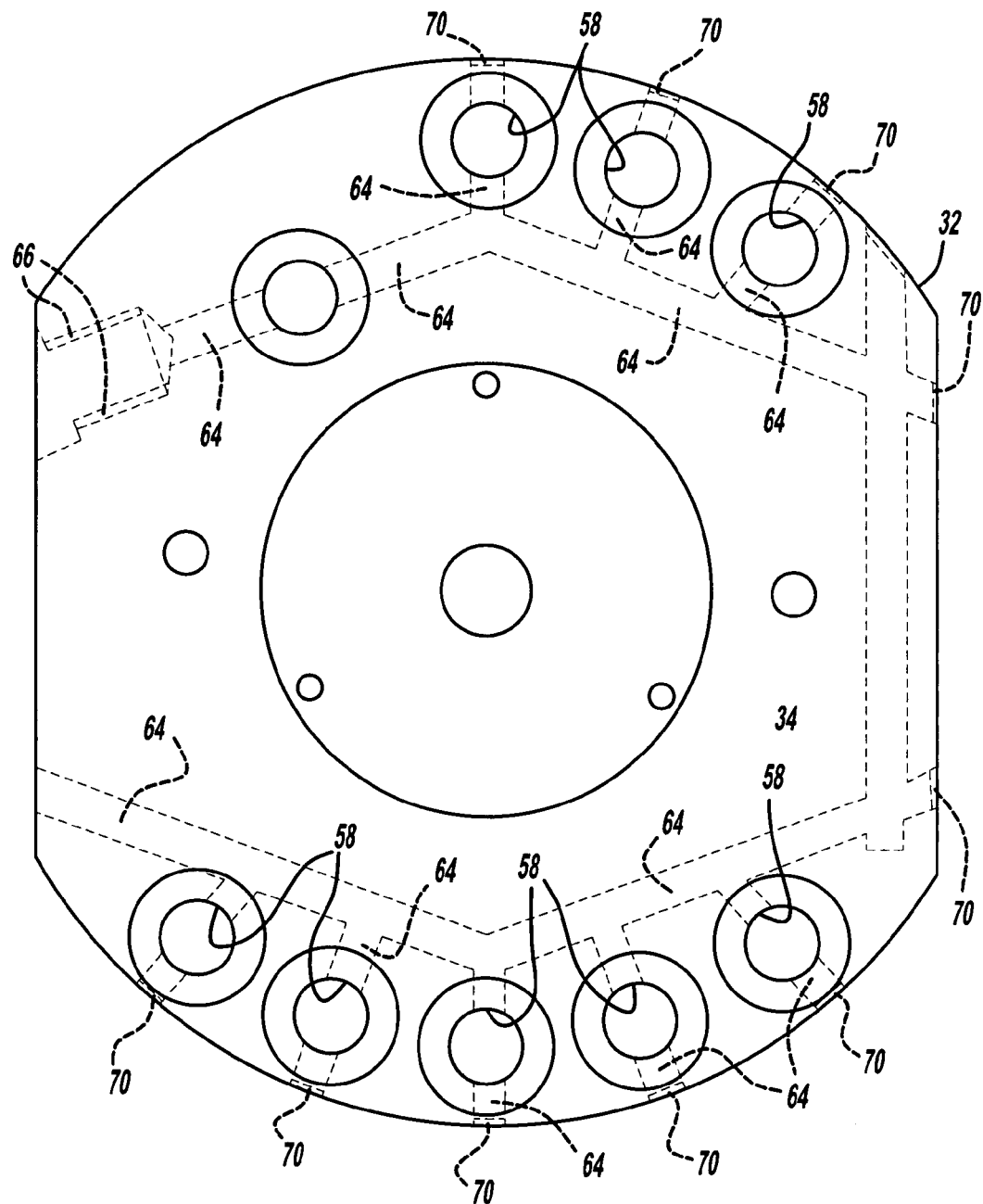
FIG. 6 is a plan view of the bottom face of the test module with the seals surrounding each pneumatic inlet and the locking mechanism (ball cage) details removed in order to illustrate the internal fluid passages.

Along the periphery of the locating plate 32 is a plurality of pneumatic feed inlets 58 which are arranged to compliment the pneumatic passages 60 of the tool module 22 shown in FIG. 3. Here again, the number of pneumatic feed inlets 58 will vary as a function of the work performed by the tool 24, 26, 28 attached to the tool module 22. In the case of the preferred embodiment each pair of vacuum suction cups 68 would normally be in communication with an individual pneumatic feed inlet 58. The pneumatic feed inlets 58 are surrounded by circular resilient seals 62 mounted on the bottom end face 36 of the locating plate 32 and through internal passages 64 in the locating plate 32, as shown in FIG. 6, interconnect the pneumatic feed inlets 58 with the inlet port 66 which is connected to the source of power or pressure (not shown) so as to provide a sealed alignment between the test module 31 and the tool module 22. The internal passages 64 required to connect the pneumatic feed inlets 58 together, as well as to the source of pressure are internal to the locating plate 32, as clearly shown in FIG. 6. These internal passages 64 have been bored into the locating plate 32 so as to isolate each of the feed circuits for the vacuum suction cups 68 that are found on the tool 24, 26, 28. This is accomplished by providing a permanent seal 70 at the end of each internal passage 64 where the internal passage 64 intersects with the outer periphery of the locating plate 32. Directly in communication with these internal passages 64, is the inlet port 66 for a source of pressure (not shown). A standard air hose coupler 72 is mounted in the inlet port 66 to attach to the source of pressure (not shown).

A shutoff valve 74 communicates with the internal passage 64 so as to enable control of the source of pressure between the various circuits in the test module 31. Also, each of the active circuits of the test module 31 are equipped with its own shutoff valve 76 to enable isolation of each individual circuit for test purposes.

When it is desired to test the integrity of all pneumatic passages 60 including the seals as well as the functionality of the attached tool 24, 26, 28, the test module 31 is aligned by the use of the tapered locator pins 54 with a tool module 22 located on the tool support rack 30 and attached thereto by turning the hand knob 42 clockwise which locks the test module 31 to the tool module 22. Upon establishing the locked connection, a source of pressure is attached to the standard air hose coupler 72 screwed into the inlet port 66 of the locating plate 32. The shutoff valve 74, is placed in a closed position to avoid any fluid transfer to any of the pneumatic circuits within the test module 31. All of the shutoff valves 76 to each of the individual circuits are placed in a closed position prior to the testing. After the test module 31 is locked to the tool module 22, the circular resilient seals 62 of each circuit are in sealed contact with the seats 80 made in the pneumatic passages 60 of the tool module 22. Each individual circuit can be independently tested by simply opening the shutoff valve 74 and one at a time opening and closing each shutoff valve 76 for each independent circuit and obtain a reading for the vacuum present within each circuit and at the tool 24, 26, 28, i.e. vacuum suction cup 68. A vacuum gauge may be used within each circuit individually or a baffle may be used to cover each of the vacuum suction cups 68 mounted on the tool 24, 26, 28 and a reading can be made by a vacuum gauge attached to the tool 24, 26, 28 to determine whether any of the nozzles, seals, pneumatic tubing, or pneumatic cups have developed a leak as a result of damage or build-up of dirt on a seal which may interfere with the specified vacuum that should be found within each individual circuit. This can also be checked by placing a baffle across the opening of each of the vacuum suction cups 68 on the tool 24, 26, 28 and by the use of a vacuum gauge mounted near the inlet port 66 or anywhere within the sealed internal passages 64. Any loss of pressure within an individual circuit can quickly be corrected by isolating the source of the pressure leak and by replacing any seal between the tool 24, 26, 28 and the test module 31, or the tubing connections between the tool module 22 and the actual tool 24, 26, 28 whereat the vacuum is generated using a venturi for each individual vacuum suction cup 68 or set of vacuum suction cups 68. If a noticeable drop in vacuum occurs, the function of the end effector 24, 26, 28 will be detrimentally affected and the tool 24, 26, 28 can either be sent to the tool room for repair or a quick fix can be made when the tool 24, 26, 28 is on its tool support rack 30 and not in use by the robot. After obtaining an acceptable vacuum reading within a circuit or when the end effector 24, 26, 28 again performs its functional purpose, the shutoff valve 76 is closed and the process is repeated for a separate pneumatic circuit and associated end effector 24, 26, 28.

After sequentially checking each of the pneumatic circuits, by closing each shutoff valve 74, 76 for the test module 31 and one at a time opening and closing each shutoff valve 74, 76 the integrity of the tool or end effector 24, 26, 28 for each circuit of the tool 24, 26, 28 can be quickly verified to ensure that the tool 24, 26, 28 is ready to perform its function the next time that the robot is programmed to use it. Accordingly, the test module 31 provides a simple and convenient means to determine the sealing status of each of the pneumatic circuits as well as the functionality of each end effector or tool 24, 26, 28 while not in use so as to insure that there will be no leak in the pneumatic circuits of the tool 24, 26, 28 or malfunction of the end effector 24, 26, 28 when the robotic application is programmed to use the tool 24, 26, 28. The use of the test module 31 guarantees that a tool 24, 26, 28 will always be functioning properly within the specification limits to allow the robot to accomplish the work on the specific parts that are conveyed along the production line. The test module 31 ensures that there will be no down time or interruption of the production line as a result of damage or malfunction of the end effector 24, 26, 28 or with anyone of the pneumatic components associated with the various tools 24, 26, 28 that are stored on the tool support rack 30.

It is understood that the above is a description of the preferred embodiment of the invention and that various modifications and improvements may be made without departing from the spirit of the invention disclosed herein. The scope of protection afforded is to be determined by the claims which follow.

What is claimed is:

1. A pneumatic test apparatus adapted to attach to a complementary member, said pneumatic test apparatus comprising:
    a base member having:
        a first end face;
        an opposite end face spaced from said first end face;
        a peripheral edge surface between said first end face and said opposite end face;
        a plurality of through passages extending from said first end face to said opposite end face;
        means for sealing mounted to said first end face and surrounding each of said plurality of through passages;
        means for selectively terminating fluid flow communication through each of said plurality of through passages, said selectively terminating means mounted to said opposite end face of said base member;
    means for locking said base member to said complementary member and thereby seal said base member interface with said complementary member;
    a plurality of internal flow passages interconnecting said plurality of through passages extending from said first end face to said opposite end face, said plurality of internal flow passages located between said first end face and said opposite end face of said base member;
    an inlet port for receiving a source of pressure/vacuum, said inlet port located in said base member, said inlet port having an inlet passage communicating with said plurality of internal flow passages;
    a shutoff valve mounted in said inlet passage of said inlet port whereby when said source of pressure/vacuum is attached to said inlet port fluid flow communication is established in said inlet passage and in each of said plurality of internal flow passages located between said first end face and said opposite end face of said base member as well as each of said plurality of through passages in said base member, said fluid flow communication selectively terminated by said means for selectively terminating fluid flow communication of each of said plurality of passages such that the pressure/vacuum in each passage can be individually leak tested, said fluid flow communication further being terminated completely by closure of said shutoff valve mounted in said inlet passage, such that when said complementary member such as an end effector is mounted to said base member and said means for sealing said interface of each of said plurality of through passages, each of said plurality of through passages can be individually seal tested in an offline location to replace any component found leaking during the nonworking cycle of said end effector.

2. The pneumatic test apparatus as claimed in claim 1 wherein said means for locking said base member to said complementary member further comprises:
    a ball cage assembly having equally spaced windows in the periphery thereof, said ball cage assembly attached to said first end face of said base member;
    a plurality of ball members supported by said ball cage assembly, each window of said ball cage assembly having one of said plurality of ball members therein;
    a piston member centrally dispersed within said ball cage assembly, said piston member having one end extending from said opposite end face of said base member and an opposite end terminating in a centrally disposed cylindrical disk having a circumferentially chamfered edge for contacting said plurality of ball members, said opposite end of said piston member having a hand knob attached thereto;
    means for moving said piston member from a locked to an unlocked position;
    a cam locking groove located in said complementary member in alignment with said ball cage assembly such that as said piston member is moved from an unlocked position wherein said ball members are radially retracted within said windows of said ball cage assembly to a locked position wherein said circumferentially chamfered edge of said cylindrical disk forces each of said ball members in each of said windows in a radially outward direction to occupy said cam locking groove of said complementary member to lock said base member to said complementary member and further whereby said means for sealing seals the interface of each of said plurality of through passages between said base member and said complementary member.

3. The pneumatic test apparatus as claimed in claim 1 wherein said means for selectively terminating fluid communication through each of said plurality of through passages further comprises:
- an inlet port for receiving said source of pressure/vacuum, said inlet port located in said base member, said inlet port having an inlet passage communicating with said plurality of internal flow passages; and
- a shutoff valve mounted in said inlet passage of said inlet port whereby when said source of pressure/vacuum is attached to said inlet port fluid flow communication is established in said inlet passage and in each of said plurality of internal flow passages located between said first end face and said opposite end face of said base member as well as each of said plurality of through passages in said base member, said fluid flow communication being terminated completely by closure of said shutoff valve mounted in said inlet passage.

4. The pneumatic test apparatus as claimed in claim 1 wherein said means for selectively terminating fluid flow communication through each of said plurality of passages further comprises:
- a shutoff valve mounted in each passage of said plurality of through passages, each shutoff valve having an open and closed position such that each of said plurality of through passages can be individually isolated from each other and individually seal tested for leaks in said offline location to replace any component found leaking during said nonworking cycle of said end effector.

5. The pneumatic test apparatus as claimed in claim 1 further comprising means for aligning said base member to said complementary member such that upon attachment of said base member to said complementary member said sealing means are guided to seal each of said plurality of through passages in said base member.

6. The pneumatic test apparatus as claimed in claim 5 wherein said alignment means further comprises:
- at least two tapered dowel members attached to said base member; and
- at least two apertures in said complementary member, each of said at least two apertures receiving a respective tapered dowel member of said at least two tapered dowel members.

7. A pneumatic test apparatus adapted to attach to a complementary member, said pneumatic test apparatus comprising:
- a base member having:
  - a first end face;
  - an opposite end face spaced from said first end face;
  - a peripheral edge surface between said first end face and said opposite end face;
  - a plurality of through passages extending from said first end face to said opposite end face;
  - a plurality of internal flow passages interconnecting said plurality of through passages extending from said first end face to said opposite end face, said plurality of internal flow passages located between said first end face and said opposite end face of said base member;
- means for sealing mounted to said first end face and surrounding each of said plurality of through passages;
- means for locking said base member to said complementary member and thereby seal said base member interface with said complementary member;
- means for selectively terminating fluid flow communication through each of said plurality of through passages, said selectively terminating means mounted to said opposite end face of said base member whereby when said complementary member such as an end effector is attached to said base member and said means for sealing mounted to said first end face seals the interface of each of said plurality of through passages, each of said plurality of through passages can be individually seal tested in an offline location to allow replacement of any component found leaking during the nonworking cycle of said end effector.

8. The pneumatic test apparatus as claimed in claim 7 further comprises an inlet port for receiving a source of pressure/vacuum, said inlet port located in said base member, said inlet port having an inlet passage communicating with said plurality of internal flow passages.

9. The pneumatic test apparatus as claimed in claim 7 further comprising a shutoff valve mounted in said inlet passage of said inlet port whereby when said source of pressure/vacuum is attached to said inlet port fluid flow communication is established in said inlet passage and in each of said plurality of internal flow passages located between said first end face and said opposite end face of said base member as well as each of said plurality of through passages in said base member such that when said complementary member such as said end effector is mounted to said base member and said means for sealing said interface of each of said plurality of through passages, each of said plurality of through passages can be individually seal tested in said offline location to replace any component found leaking during said nonworking cycle of said end effector.

10. The pneumatic test apparatus as claimed in claim 7 wherein said means for locking said base member to said complementary member further comprises:
- a ball cage assembly having equally spaced windows in the periphery thereof, said ball cage assembly attached to said first end face of said base member;
- a plurality of ball members supported by said ball cage assembly, each window of said ball cage assembly having one of said plurality of ball members therein;
- a piston member centrally dispersed within said ball cage assembly, said piston member having one end extending from said opposite end face of said base member and an opposite end terminating in a centrally disposed cylindrical disk having a circumferentially chamfered edge for contacting said plurality of ball members, said opposite end of said piston member having a hand knob attached thereto;
- means for moving said piston member from a locked to an unlocked position;
- a cam locking groove located in said complementary member in alignment with said ball cage assembly such that as said piston member is moved from said unlocked position wherein said ball members are radially retracted within said windows of said ball cage assembly to a locked position wherein said circumferentially chamfered edge of said cylindrical disk forces each of said ball members in each of said windows in a radially outward direction to occupy said cam locking groove of said complementary member to lock said base member to said complementary member and further whereby said means for sealing seals the interface of each of said plurality of through passages between said base member and said complementary member.

11. The pneumatic test apparatus as claimed in claim 7 wherein said means for selectively terminating fluid communication through each of said plurality of through passages further comprises:
- an inlet port for receiving said source of pressure/vacuum, said inlet port located in said base member, said inlet port having an inlet passage communicating with said plurality of internal flow passages; and
- a shutoff valve mounted in said inlet passage of said inlet port whereby when said source of pressure/vacuum is attached to said inlet port fluid flow communication is established in said inlet passage and in each of said plurality of internal flow passages located between said first end face and said opposite end face of said base member as well as each of said plurality of through passages in said base member, said fluid flow communication being terminated completely by closure of said shutoff valve mounted in said inlet passage.

12. The pneumatic test apparatus as claimed in claim 7 wherein said means for selectively terminating fluid flow communication through each of said plurality of passages further comprises:
- a shutoff valve mounted in each passage of said plurality of through passages, each shutoff valve having an open and closed position such that each of said plurality of through passages can be individually isolated from each other and individually seal tested for leaks in said offline location to replace any component found leaking during said nonworking cycle of said end effector.

13. The pneumatic test apparatus as claimed in claim 7 further comprising a means for aligning said base member to said complementary member such that upon attachment of said base member to said complementary member said sealing means are guided to seal each of said plurality of through passages in said base member.

14. The pneumatic test apparatus as claimed in claim 13 wherein said alignment means further comprises:
- at least two tapered dowel members attached to said base member; and
- at least two apertures in said complementary member, each of said at least two apertures receiving a respective tapered dowel member of said at least two tapered dowel members.

* * * * *